US007370060B2

(12) United States Patent
Jain et al.

(10) Patent No.: US 7,370,060 B2
(45) Date of Patent: May 6, 2008

(54) SYSTEM AND METHOD FOR USER EDIT MERGING WITH PRESERVATION OF UNREPRESENTED DATA

(75) Inventors: Rupali Jain, Bellevue, WA (US); Mark L. Nielson, Snohomish, WA (US); Zeeshan Hamid, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 378 days.

(21) Appl. No.: 11/136,945

(22) Filed: May 24, 2005

(65) Prior Publication Data

US 2006/0271567 A1    Nov. 30, 2006

(51) Int. Cl.
*G06F 17/30* (2006.01)
(52) U.S. Cl. .................. 707/102; 707/203; 715/516
(58) Field of Classification Search ............ 707/1, 707/2, 3, 4, 5, 102, 203; 709/203; 700/2
See application file for complete search history.

(56) References Cited

U.S. PATENT DOCUMENTS

| | | | | |
|---|---|---|---|---|
| 6,006,227 | A * | 12/1999 | Freeman et al. ................. 707/7 |
| 6,614,781 | B1 * | 9/2003 | Elliott et al. ................. 370/352 |
| 6,842,906 | B1 * | 1/2005 | Bowman-Amuah ......... 719/330 |
| 7,072,898 | B2 * | 7/2006 | Bussler et al. ............... 707/101 |
| 7,072,934 | B2 * | 7/2006 | Helgeson et al. ........... 709/203 |
| 7,200,668 | B2 * | 4/2007 | Mak et al. ................... 709/230 |
| 2001/0042078 | A1 * | 11/2001 | Anwar ........................ 707/500 |
| 2002/0049749 | A1 * | 4/2002 | Helgeson et al. ............... 707/3 |
| 2002/0129092 | A1 * | 9/2002 | Tolson et al. ................ 709/202 |
| 2002/0138155 | A1 * | 9/2002 | Bristol ............................ 700/2 |
| 2002/0161796 | A1 * | 10/2002 | Sylthe ......................... 707/500 |
| 2003/0233376 | A1 * | 12/2003 | Bussler et al. ............. 707/104.1 |
| 2006/0023945 | A1 * | 2/2006 | King et al. .................. 382/173 |
| 2006/0026140 | A1 * | 2/2006 | King et al. .................... 707/3 |
| 2006/0030292 | A1 * | 2/2006 | Bosworth et al. ........... 455/408 |
| 2006/0031256 | A1 * | 2/2006 | Bosworth et al. ......... 707/104.1 |
| 2006/0036568 | A1 * | 2/2006 | Moore et al. .................. 707/1 |
| 2006/0041590 | A1 * | 2/2006 | King et al. ............... 707/104.1 |
| 2006/0104515 | A1 * | 5/2006 | King et al. .................. 382/190 |
| 2006/0294094 | A1 * | 12/2006 | King et al. .................... 707/6 |
| 2007/0033252 | A1 * | 2/2007 | Combest ..................... 709/204 |
| 2007/0112810 | A1 * | 5/2007 | Jonsson ...................... 707/101 |

* cited by examiner

*Primary Examiner*—Jean M. Corrielus
*Assistant Examiner*—Mohammed R Uddin
(74) *Attorney, Agent, or Firm*—Merchant & Gould

(57) ABSTRACT

A system and method for preserving unrepresented data in a document exchanged between applications. Applications handling the document, or computing devices executing the applications may have different capabilities with respect to a particular feature of the document such as certain formatting properties, footnotes, graphical attributes, and the like. Data associated with such features, unrepresented data, is preserved by employing a tree structure for the document and flagging nodes associated with unrepresented data. Flagged nodes are ignored, but preserved, when the document is handled by an application or computing device with different capabilities. When the document is handled again by an application or computing device that is capable of processing those features, the unrepresented data is made available along with any modifications made to the document during the previous handling.

18 Claims, 8 Drawing Sheets

```
                                        <w:body>
                                /          <w:properties>
                              /            </w:properties>
                            /              <w:p>
<w:wordDocument>          /                    <w:r>
<w:fonts>                /                         <w:t>This is</w:t>
                        /                      </w:r>
:                      /                       <w:annotation_start >
</w:fonts>            /                        <w:r>
<w:lists>            /                             <w:t>fun</w:t>
                    /                          </w:r>
:                                              <w:annotation_end >
</w:lists>                                     <w:annotation >
<w:styles>         /                           <w:p>
                  /                                <w:r>
:                /                                     <w:t>Comment Text Here</w:t>
</w:styles>     /                                  </w:r>
<w:body>      /                                </w:p>
</w:body>  ‐ ‐ _                               </w:annotation >
</w:wordDocument>       ‐ ‐ _             </w:p>
                              ‐ ‐ _   </w:body>
```

*Fig. 5B*

SYSTEM AND METHOD FOR USER EDIT MERGING WITH PRESERVATION OF UNREPRESENTED DATA

BACKGROUND OF THE INVENTION

Computing devices have proliferated in numbers and types over the recent years becoming a part of daily life for many people. Different computing devices, such as laptops, Personal Digital Assistants (PDA's), smart phones, and the like, have displays and graphics controllers with varying capabilities.

Displays are composed of a rectangular array of pixels (picture elements). The more pixels, the more detail may be shown in a given amount of space. This is termed the resolution. In order to work together, operating systems, graphics cards, and monitors support a number of standard video modes. As hardware has improved, and users have become more demanding, video modes have tended towards higher resolutions and greater color depth. As a result, a larger amount of memory is dedicated to display operations on a computer motherboard and/or on the graphics card.

On the other hand, physical and economical restraints tend to encourage software developers to provide applications with distinct levels of capabilities for different computing devices. For example, the full version of MICROSOFT WORD® (Registered Trademark of Microsoft Corp.) includes a large number of user edit capabilities that may be completely exploited in a computing device with an advanced graphics controller and display. Versions of the same application such as WORD MOBILE® (Registered Trademark of Microsoft Corp.) are also available for computing devices with limited display and graphics capabilities enabling the user to use the word processing application without all functions.

SUMMARY OF THE INVENTION

Aspects of the present invention relate to a system and method for preserving unrepresented data in a document exchanged between applications. When a document created in an application with richer capabilities is displayed on a device or in an application which does not expose those capabilities, not all of the content may be displayed. A document displayed in one of these limited applications is, therefore, considered to be comprised of represented data and unrepresented data. Represented data includes any data associated with the document that is consumed by the application or device with different capabilities. Unrepresented data includes data associated with the document that is not consumed by the application or device with different capabilities.

According to aspects of the present invention, unrepresented data may be preserved by employing a tree structure for the document that assigns nodes to portions of represented and unrepresented data associated with the document. When the document is to be handled by an application or device with different capabilities, the nodes corresponding to unrepresented data are flagged such that they are preserved during any edits on the document. Accordingly, the unrepresented data is used again when the document is handled in an application/computing device with capabilities that allow the unrepresented data to be displayed.

When editing the document, the nodes of tree structure represented in the document may be edited while the other nodes are ignored. Despite ignoring the nodes corresponding to the unrepresented data, the present invention still preserves these nodes.

In accordance with one aspect, a computer-implemented method is provided for preserving unrepresented data in a document exchanged between a first application and a second application. The method includes parsing the document to generate a tree representation of the document, where a root of the tree corresponds to the document and nodes of the tree correspond to one of elements and properties of the document. The method further includes associating a size with each node of the tree and flagging a node when the node corresponds to unrepresented data. A size of a leaf node corresponding to an element is determined by a number of document units associated with the element, and a size of a branch node is determined by an aggregate of leaf node sizes underneath the branch node. The method also includes observing the flagged node when exchanging the document between the first application and the second application such that unrepresented data is substantially maintained.

According to a further aspect, another computer-implemented method for handling a document with unrepresented data, exchanged between a first application and a second application includes parsing a tree representation of the document beginning with a root node. The root node includes accumulated size information corresponding to a sum of sizes of all child nodes within the tree. The method also includes ignoring each node with a size value of zero where a size value of a leaf node corresponding to an element is determined by a number of document units associated with the element, and a size value of a branch node is determined by an aggregate of leaf node size values underneath the branch node.

The method further includes accumulating the size values as the tree is parsed and completing the parsing when the accumulated size values are substantially equal to the root node size value.

According to another aspect, the method may be complemented with editing the document by performing at least one of inserting new document units, deleting existing document units, and modifying existing document units in the document. Furthermore, the document may be saved or transmitted following the editing. Each node with the size value of zero is observed such that unrepresented data associated with each node with the size value of zero is substantially maintained.

BRIEF DESCRIPTION OF THE DRAWINGS

FIG. 5B illustrates an XML listing of the example MICROSOFT WORD® document of FIG. 5A.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take at least the meanings explicitly associated herein, unless the context clearly dictates otherwise. The meanings identified below are not intended to limit the terms, but merely provide illustrative examples for the terms. The term "edit surface" means an application or a computing device employed in handling a document. A "document" refers to a set of computer-executable instructions and data associated with a program including, but not limited to, a word processing program, a spreadsheet program, a database program, and a browser program. The term "size" refers to a number of document units corresponding to a document element or a number of document units corresponding to a node representing the document element in a tree structure.

Illustrative Operating Environment

Figure 1:
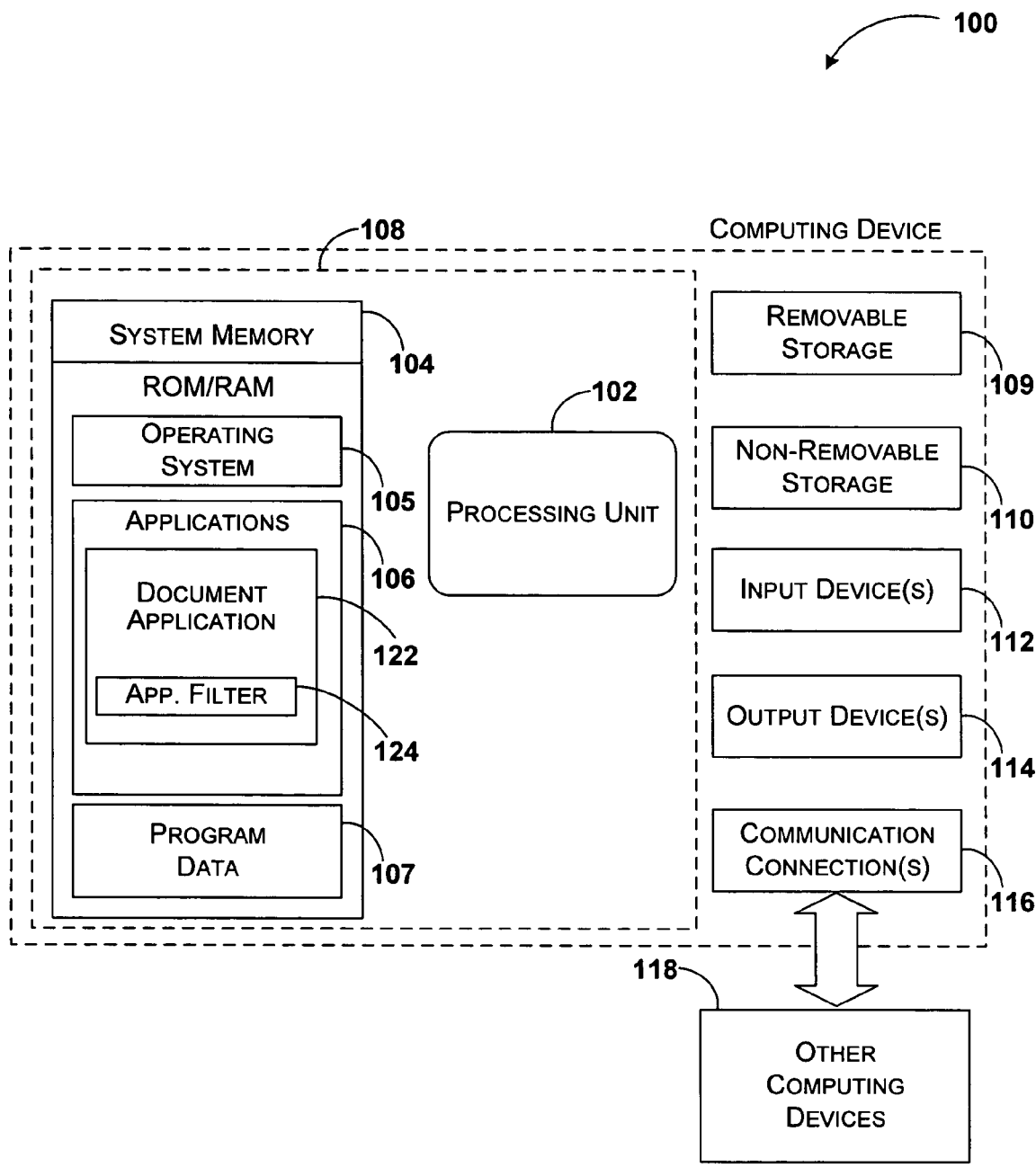
FIG. 1 illustrates a computing device that may be used according to an example embodiment.

Referring to FIG. 1, an example system for implementing the invention includes a computing device, such as computing device 100. Computing device 100 may be embodied as one of a number of devices with varying capabilities including, but not limited to, a laptop, a smart phone, a PDA, a tablet PC, and a desktop PC.

In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100.

Computing device 100 may also have input device(s) 112 such as keyboard, mouse, pen, voice input device, touch input device, etc. Output device(s) 114 such as a display, speakers, printer, etc. may also be included. While all these devices are known in the art and need not be discussed at length here, the display devices (not shown) may include a wide variety of devices such as LCD displays, CRT displays, TV monitors, handheld displays, and the like, each with distinct graphics capabilities.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

In one embodiment, applications 106 further include document application 122, which may include any type of software application that generates, modifies, and uses documents. Examples of document application 122 include word processing programs, spreadsheet programs, browsers, and the like. In one embodiment, document application 122 may include application filter 124 for processing elements of a document based on capabilities of document application 122 and/or computing device 100.

Illustrative Embodiments for Providing User Edit Merging with Preservation of Unrepresented Data Embodiments of the present invention relate to a system and method for preserving unrepresented data in a document exchanged between applications. A document created in an application with richer capabilities may be handled on a device or in an application with different capabilities, where some of the content cannot be displayed. The document includes represented data and unrepresented data. Represented data includes any data associated with the document that is consumed by the application or device with different capabilities. Unrepresented data includes data associated with the document that is not consumed by the application or device with different capabilities.

Unrepresented data may be preserved by employing a tree structure for the document that assigns nodes to portions of represented and unrepresented data associated with the document. When the document is to be handled by an application or device with different capabilities, the nodes corresponding to unrepresented data are flagged such that they are preserved during any edits on the document. Accordingly, the unrepresented data may be used again when the document is handled in an application/computing device with capabilities that allow the unrepresented data to be displayed.

In one embodiment, the flagging may involve assigning a size "0" to the nodes corresponding to unrepresented data. Such nodes may be ignored by the application or device with limited application when handling the document. Edits to the document may take into account, however, the presence of such nodes. Accordingly, edits to the document may be merged with unrepresented data for use by an application or device with richer capabilities.

Figure 2:
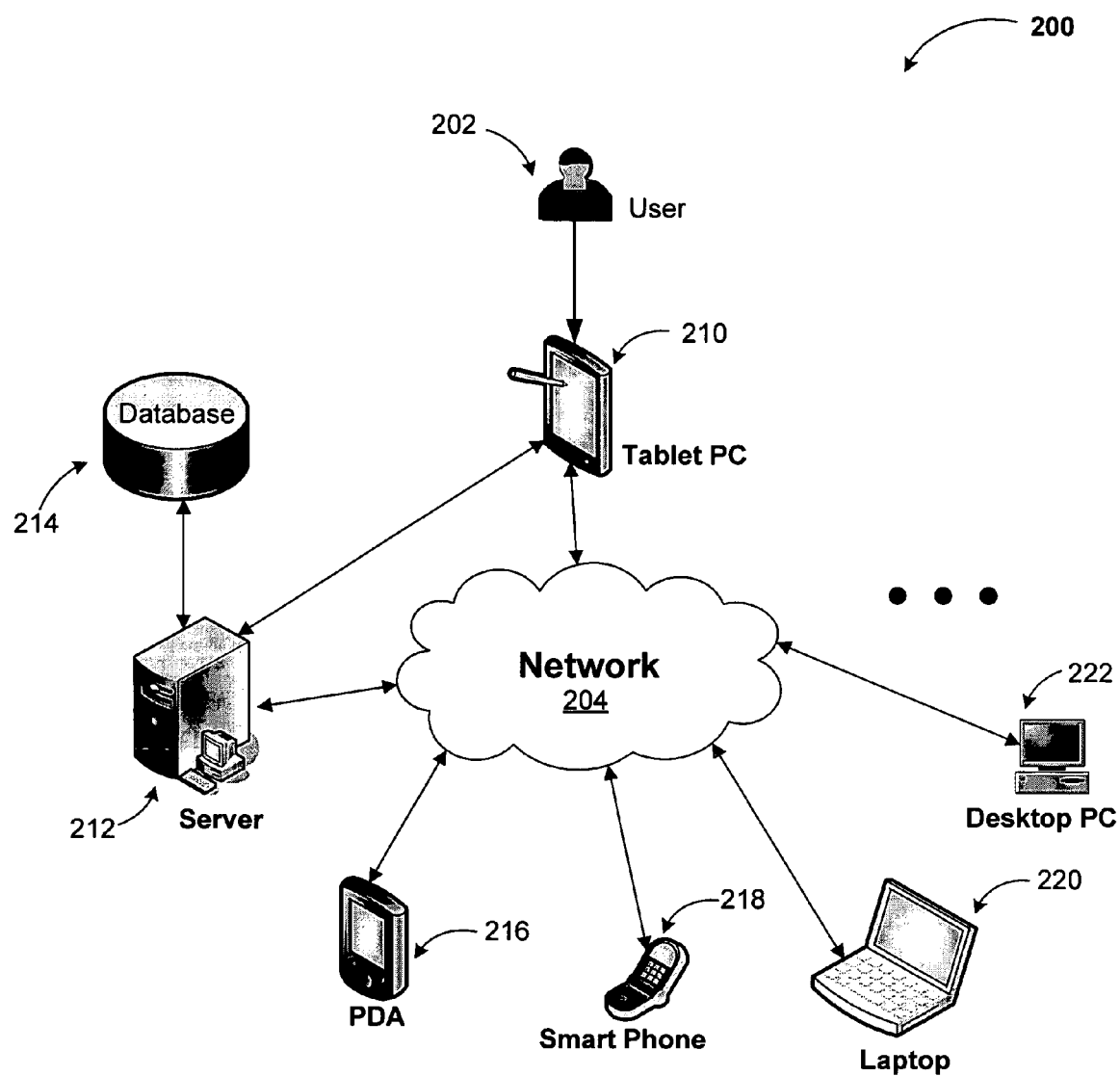
FIG. 2 illustrates an example system where documents may be handled by a variety of computing devices.

FIG. 2 illustrates example system 200 where documents may be handled by a variety of computing devices. System 200 includes network 204, in which server 212, tablet PC 210, and a number of computing devices (e.g. computing devices 216-222) participate. Server 212 may be connected to database 214, where documents and other files may be stored.

In one embodiment, user 202 may edit a document using an application such as a word processor, a spreadsheet application, a browser, and the like, on tablet PC 210. User 202 may then arrange for transfer of the edited document to another computing device such as PDA 216, smart phone 218, laptop 220, desktop PC 222, and the like, over network 204. In another embodiment, the document may be transferred between two computing devices through other means such as direct communication, removable media (CD-ROM, flash drive, etc.), and the like.

Various computing devices, some of which are shown in FIG. 2 as examples, may have differing display capabilities. Furthermore, applications handling the document may have distinct limitations with respect to their ability to process particular features of the document. When a document is represented on a display that is not capable of rendering all the features present in the underlying document representation, one way to preserve these un-represented features on save is to save the user edits and apply them back to the original document. One difficulty of this approach is relating a location of a change on the limited display to the location of data in the originating document.

Embodiments of the present invention provide a method for determining that relationship and enable mapping of the changes to the original document at the time the document is edited. Mapping of the changes may be performed in real time or in memory when the document is saved.

By way of example, word processing application MICROSOFT WORD® provides a large number of features editable by a user such as various formatting properties (including color, shape, spacing, and style of characters), footnotes, comments, tags, revisions, and the like. Such extensive features usually require considerable amount of memory and storage in the computing device executing the application. Not all computing devices have adequate memory and processing capability to execute MICROSOFT WORD® in its full capacity. Particularly, portable devices such as PDA's, smart phones, and the like, have not only restricted processing capacity and memory, but their displays are limited as well. Such devices may run a limited version of MICROSOFT WORD® like WORD MOBILE®.

Due to the listed restrictions, certain features of MICROSOFT WORD® are excluded in applications like WORD MOBILE®. When user 202 edits a document originally generated by MICROSOFT WORD® in a restricted device like tablet PC 210 he/she is unable to see the excluded features. Accordingly, the user cannot tell what happens to the excluded features after the document is edited, but may desire to retain those features for later use in the full capacity application.

Another example of excluded features occurs when documents or portions of documents are exchanged between different applications, even when the same computing device is used. Many applications allow users to import and export documents or portions of documents today. For example, tables may be imported from spreadsheet application MICROSOFT EXCEL® (Registered Trademark of Microsoft Corp.) to MICROSOFT WORD® and vice versa. However, each application has its own set of specific features that may not be displayed or used in the other application. After editing the document in the importing application, the user may desire to export the document (or a portion of it) back to the originating application. In that case, retaining the original features along with the changes made in the importing application is again a valuable aspect.

Figure 3:
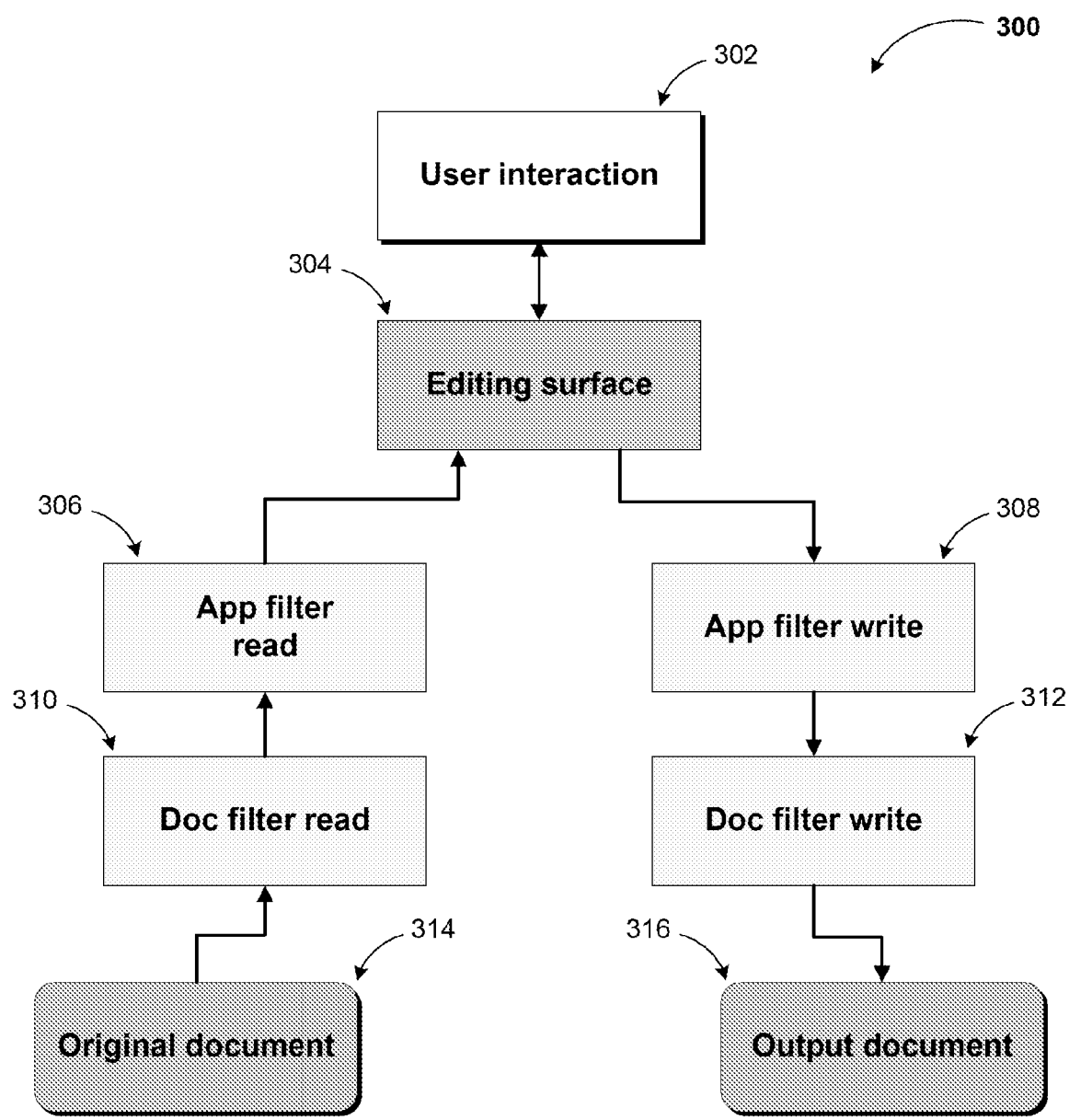
FIG. 3 illustrates an conceptual structure for user editing of a document according to one embodiment.

FIG. 3 illustrates conceptual structure 300 for user editing of a document according to one embodiment. Conceptual structure 300 begins with original document 314, which may include a number of features such as those described in conjunction with FIG. 2.

The document may be viewed as comprising basic elements, each of which comprises a unit element. For example, in WORD MOBILE®, the basic elements are paragraphs and tables, and a unit element is a character. Original document 314 may go through document filter read 310, which determines basic elements and unit elements such that original document 314 can be displayed on editing surface 304.

Following document filter read 310, an application filter read (306) may be performed determining specific features of original document 314. As described in detail below, original document 314 may be represented in a tree structure with nodes representing the basic elements and the unit elements. Other nodes may represent properties associated with the basic elements and the unit elements. Application filter read 306 may determine which nodes can be displayed or processed by editing surface 304 and flag them.

Editing surface 304 is a computing device where a user edits original document 314 through user interaction 302. Editing surface 304 may also be an application that is used by the user to edit original document 314. Once editing is performed on original document 314, application filter write 308 merges the user changes to the tree structure representing the document. In another embodiment, application filter write 308 may also convert the document tree to another structure (such as an XML tree structure) that can be consumed by document filter write 312. The merging process is described in more detail below in conjunction with FIGS. 4 and 5A.

Document filter write 312 provides output document 316 based on the tree structure from application filter write 308. Output document 316 includes all of the user changes to the displayed features as well as original features of the document that may not have been displayed or processed by editing surface 304.

Figure 4:
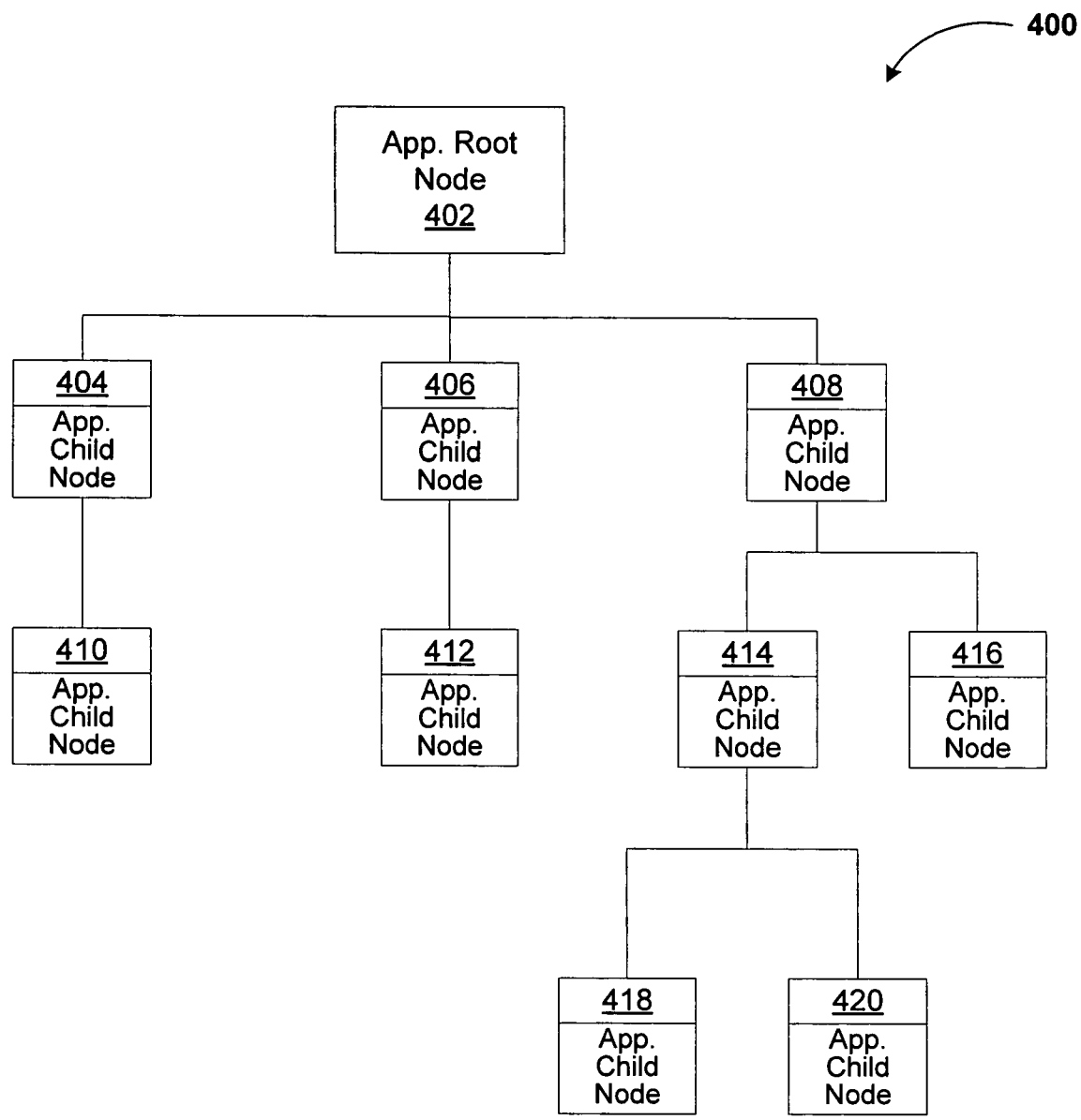
FIG. 4 is a diagram illustrating a generic tree structure for a document.

FIG. 4 is a diagram illustrating generic tree structure 400 for a document. Tree structure 400 includes application root node 402 and example application child nodes 404-420 arranged as leaf and branch nodes underneath application root node 402. Elements and properties associated with the elements are each represented by a node in tree structure 400 according to their hierarchical relationship.

Every node in tree structure 400 may have a name, properties, and size. The name represents the tag/identifier that the node represents, and the size field stores the edit surface representation size in units of that particular node.

Practically, only leaf nodes have a real size associated with them. A leaf node represents a collection of unit elements. The sizes of the leaf nodes are accumulated from the lowest levels up toward the root of the tree. At each level, the size of a branch node represents an aggregate of the leaf nodes underneath that branch node. The root node's size represents the total number of unit elements that occur in the whole document as displayed on the edit surface.

As mentioned before, child nodes (branch or leaf) may represent elements such as paragraphs, words, and characters in a word processing application. In a spreadsheet application, the elements may represent individual spreadsheets, tables, cells, and the like.

The edits made on the edit surface are tracked by location on the edit surface. To find where an edit belongs in the tree, the document is scanned top-down, from the root, and at each level looking for a child node, which encompasses the change, and going down from there, until the leaf node with the change is reached.

In one embodiment, nodes representing features that are not displayable (unrepresented data) by the edit surface are flagged. Flagging the nodes may include assigning them a specific size such as "0". When counting the nodes and searching for the unit element locations, the nodes with size "0" may then be ignored, since they do not show up on the edit surface, and hence cannot be edited.

Other nodes that are used by the application processing the document but are not always displayed, such as certain properties, may also be assigned size "0" and ignored when counting and aggregating node sizes to determine branch node and root node sizes.

In another embodiment, the nodes corresponding to unrepresented data may be flagged by other means such as a data structure, a special character, or a different size value (e.g. 9999).

Figure 5A:
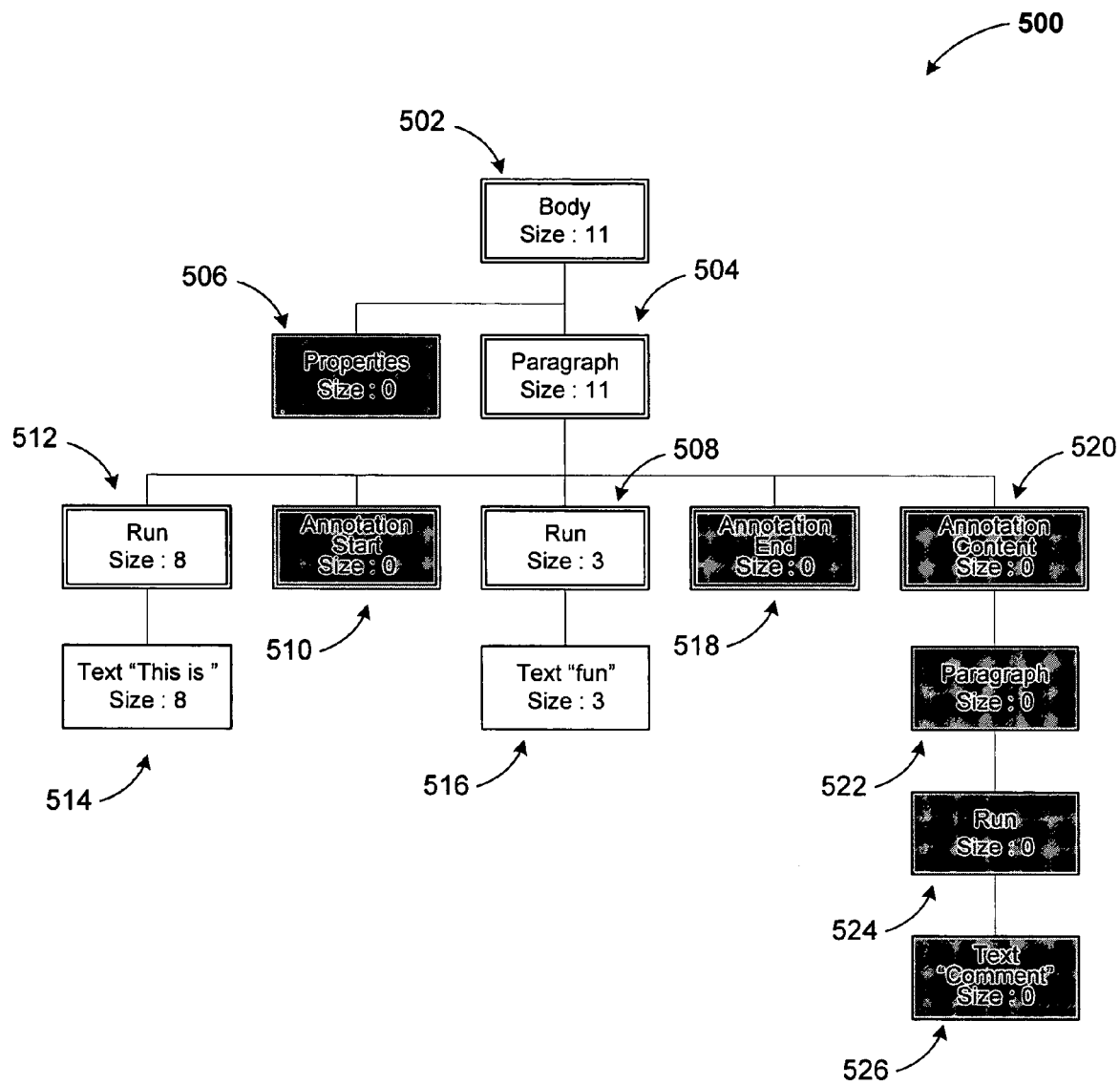
FIG. 5A is an example tree structure of a MICROSOFT WORD® document according to one example embodiment.

FIG. 5A is example tree structure 500 of a MICROSOFT WORD® document according to one example embodiment. The example MICROSOFT WORD® document includes one sentence with a comment associated with one word of the sentence. The sentence is:

"This is [fun]", where the square brackets are used to indicate the comment tag associated with the word fun. The content of the comment is "Comment". In a fully capable version of MICROSOFT WORD®, the sentence is represented with highlighting on the word fun, or a small tag indicating the presence of the comment. However, in a limited version such as WORD MOBILE®, the comment tag may not be displayed.

Tree structure 500, which is arranged to reflect the hierarchical relationships of the MICROSOFT WORD® document, begins with root node 502. Root node 502 has the name body and size 11, reflecting a total size of unit elements (characters) in the document.

Next level of nodes underneath root node 502 includes branch node 504 (name: Paragraph and size: 11) and leaf node 506 (name: Properties, size: 0). Because leaf node 506 does not include any displayable characters, it is assigned size "0".

Branch node 504 includes five child nodes at the next level. The first node under branch node 504 is branch node 512 having a name "run" and a size: "8" indicating that this branch corresponds to a run of characters of eight characters in length. The characters forming the first two words "This is" are included in leaf node 514 (name: text, size: 8) under branch node 512.

Before the other branch node representing the remaining text of the document is leaf node 510. Leaf node 510 has a name "annotation start" and a size "0" indicating the beginning of a comment field. Next is branch node 508 (name: run, size: 3) representing the remaining word "fun". The characters forming the remaining word "fun" are included in leaf node 516 (name: text, size: 3) under branch node 508.

Branch node 508 is followed (at the same level) by leaf node 518 (name: annotation end, size: 0). Leaf node 518 indicates the end of the comment field. The last node on the same level in tree structure 500 is branch node 520 (name: annotation content, size: 0). Under the branch node 520 are branch nodes 522 (name: paragraph, size: 0) and 524 (name: run, size: 0). At the lowest level is leaf node 526 (name: text, size: 0) that includes the content of the comment "Comment".

If tree structure 500 is to be generated based on the example sentence, first root node 502 is created. Then, the branch nodes and leaf nodes underneath it are created based on the text with each node representing displayable characters being assigned a size based on the number of characters. The root node size may be updated with each added node of positive size or once all child nodes are completed.

The reverse process of determining contents of a document from the tree structure begins at the root node. Sizes of child nodes are counted going down at each level until the root node size is reached, as described in more detail below in conjunction with FIG. 7.

Changes to the MICROSOFT WORD® document may be reflected by inserting additional nodes to tree structure 500 or deleting nodes from tree structure 500. For example, if the word "fun" is to be italicized, a property node with size "0" may be added next to the leaf node representing the word. If the word is to be modified to "funny", the content of leaf node 516 is changed to "funny" and the sizes of branch node 508 and leaf node 516 are changed to 5. The size of root node 502 is also updated to reflect the additional characters. As can be seen, the change to the word does not affect the comment, which is not displayed in the limited edit surface.

The edits to a document may be categorized in three groups:
  1. Insert
  2. Delete
  3. Modify Insert creates new nodes in the tree, and since only the size of each node is tracked, the chain up to the root is updated to reflect the change in size of the tree. While performing inserts the associated set of properties for the node(s) being inserted are inherited from the existing ones.

In Delete operation, what the user perceives as being deleted on the edit surface is eliminated, while leaving information that the edit surface is unable to display. For example, if the word "fun" is deleted, the comment field may be left next to the word "is". On the other hand, if the whole sentence is deleted, the comment field and associated nodes are eliminated as well.

The Modify operation does not cause any change in sizes of the nodes. The properties of affected nodes in the tree are changed or new property nodes are inserted with size "0". Operations such as cut and paste can be reduced to equivalent delete, insert, and modify sequences.

In some cases, nodes at edit boundaries may need to be split to correctly capture the new information. Because the complete representation of the data from the original format in the tree is available (associated with this representation is the size on the edit surface of the limited display), the actual edit point may be traced back to the original document based on the sizes of the nodes. Accordingly, the changes may be played back and applied to the tree in the order they were performed by the user. In one embodiment, the tree may be dynamically updated to be representative of the document at any given point in time.

FIG. 5B illustrates XML listing 550 of the example MICROSOFT WORD® document of FIG. 5A. XML listing 550 begins with document identifier, followed by a list of properties such as fonts, lists, styles, and the like. The portion of the document reflected by tree structure 500 is included between the lines <w:body> and </w:body>. In other embodiments, one or more of the properties, such as fonts, may be included in tree structure 500 as well.

Nodes of tree structure 500 representing properties, paragraphs, runs, text, and the comment (annotation) are reflected as XML commands. For example, branch node 504 representing the paragraph is reflected in XML listing 550 between the XML commands <w:p> and </w:p>. Similarly, the comment field begins with <w:annotation_start> and ends with <w:annotation_end>, where the content of the command is reflected within the XML commands <w:annotation> and </w:annotation>.

Figure 6:
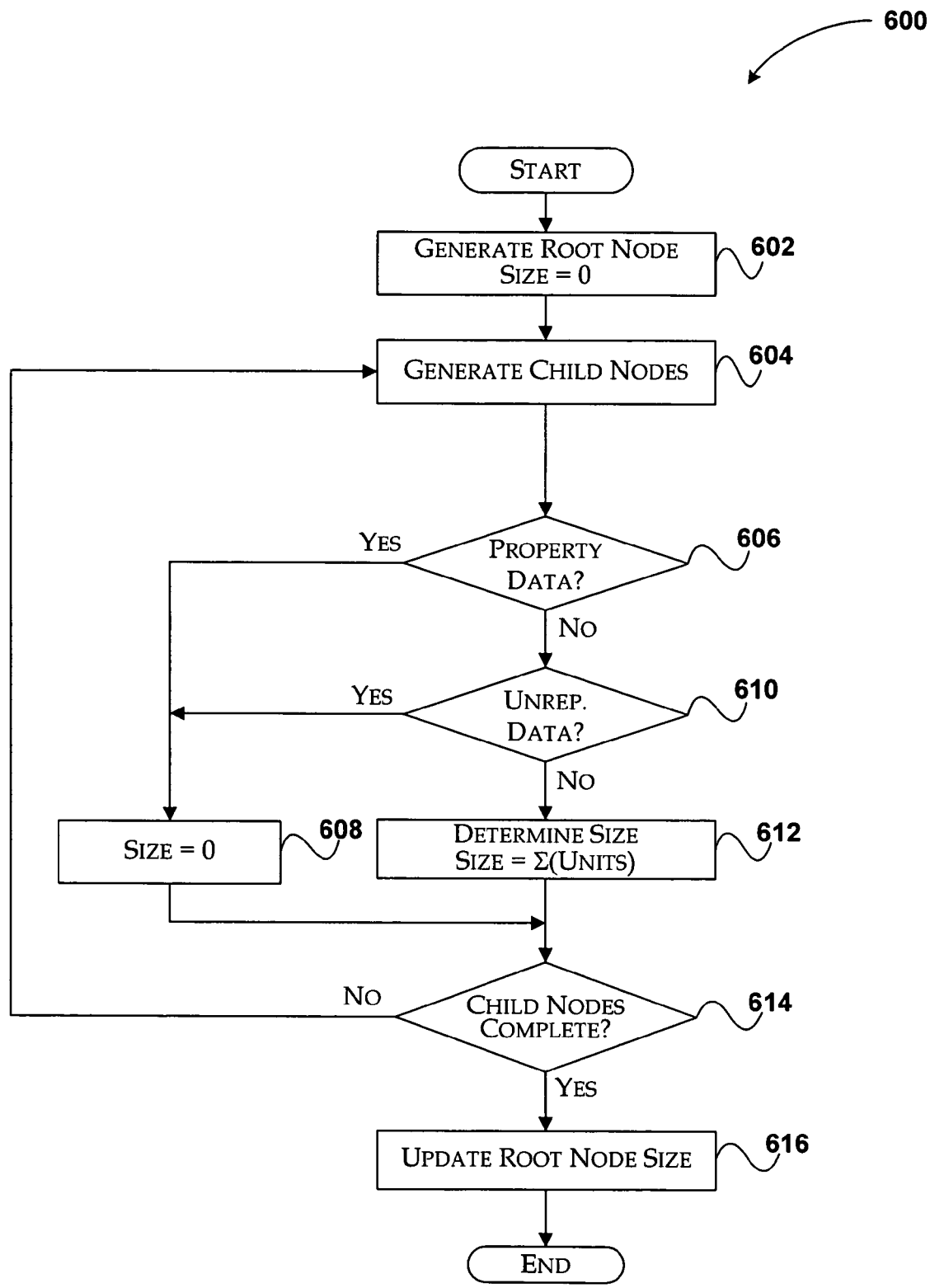
FIG. 6 is a logic flow diagram illustrating an example process for parsing a document into a tree structure according to a further embodiment.

FIG. 6 is a logic flow diagram illustrating example process 600 for parsing a document into a tree structure according to a further embodiment. Process 600 may be performed by a document application such as document application 122 or an application filter such as application filter 124 of FIG. 1. Process 600 begins at block 602, where a root node is generated. Initially, the root node has size "0". Processing moves from block 602 to block 604.

At block 604, a child node is generated in a hierarchical relationship representing basic elements and unit elements, as well as properties associated with those. Processing moves to decision block 606 next.

At decision block 606, a determination is made whether the child node includes property information. If the child node includes property information, processing moves to decision block 608, where size "0" is assigned to the node and processing advances to decision block 614. If the decision is negative, processing advances to decision block 610.

At decision block 610, a determination is made whether the child node includes unrepresented data. If the child node includes unrepresented data, processing moves again to block 608, where size "0" is assigned to the node and processing moves from block 608 to decision block 614. If the decision is negative, processing advances to block 612.

At block 612, a size of the child node is determined based on a sum of the unit elements (e.g. characters, cells, etc.). For branch nodes, the size of the node is the sum of the sizes of child nodes underneath that branch node. Each time a leaf node is generated, a size of the branch node above that leaf node is updated all the way to the root node. Processing moves next to decision block 614.

At decision block 614, a determination is made whether all child nodes have been created. If additional child nodes remain to be created, processing returns to block 604. Otherwise, processing moves to block 616. At block 616, the size of the root node is updated to reflect the sum of all child nodes within the document. In another embodiment, the size of the root node may be updated each time a child node is added to the tree structure. Processing then proceeds to a calling process for further actions.

Figure 7:
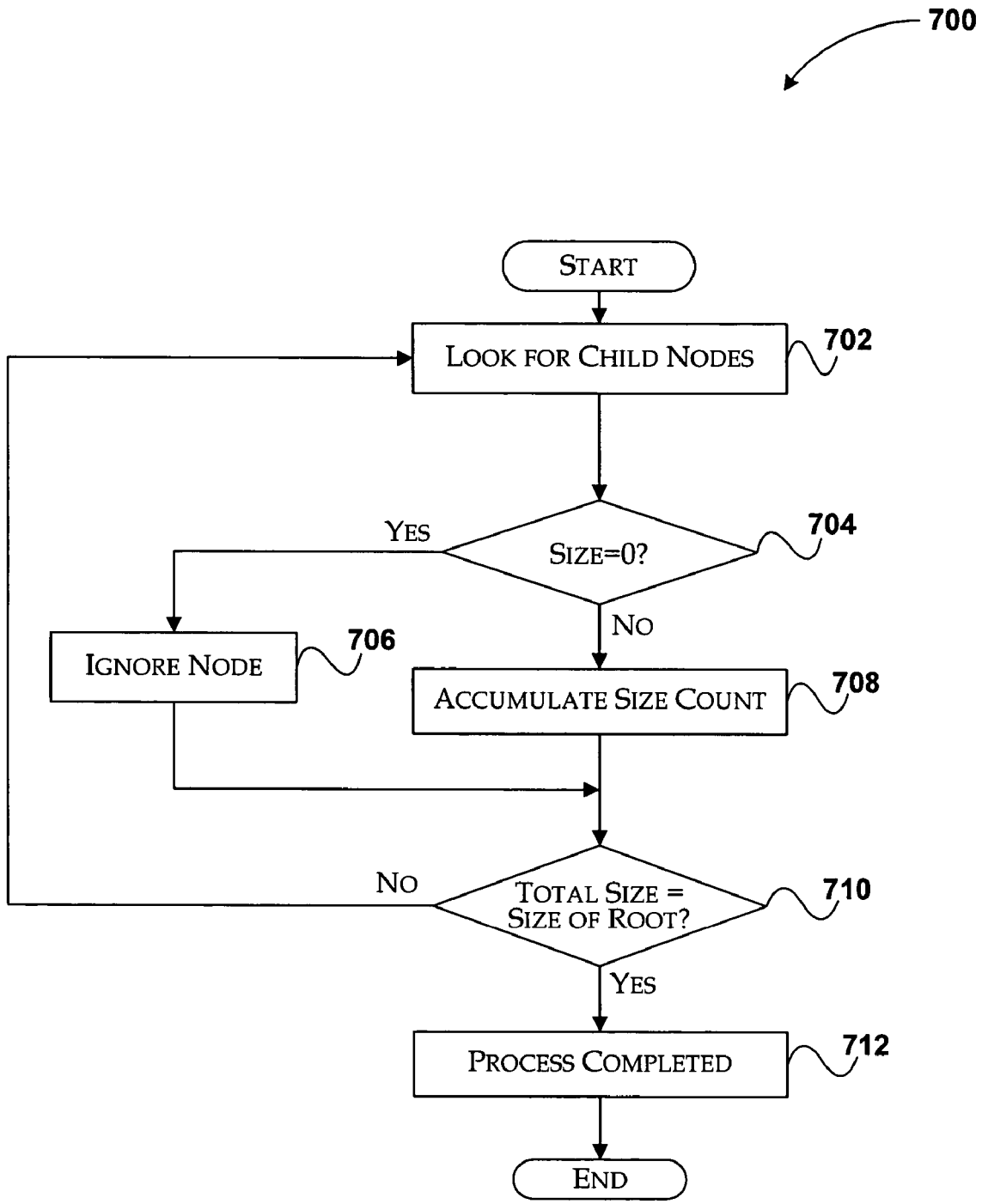
FIG. 7 is a logic flow diagram illustrating an example process for retrieving a document from a tree structure according to another embodiment.

FIG. 7 is a logic flow diagram illustrating example process 700 for retrieving a document from a tree structure according to another embodiment. Process 700 begins at block 702, where the application begins looking for child nodes underneath the root node. When a child node is found, its size is checked. Processing moves from block 702 to decision block 704.

At decision block 704, a determination is made the child node size is "0". If the child node size is "0", processing moves to block 706, where the node is ignored for the purpose of determining elements and processing returns from block 706 to block 710. Process 700 describes actions performed in a limited application or computing device. If the document is determined from a tree structure in a full capacity application or computing device, the "0" size nodes need not to be ignored. If the determination at decision block 704 is negative, processing advances to block 708.

At block 708, a size count of the child nodes found so far is accumulated. The contents of the child nodes with non-zero sizes are consumed by the application for document processing purposes. Processing moves next to decision block 710.

At decision block 710, a determination is made whether the total accumulated size of the child nodes found so far is equal to the size of the root node. If the accumulated sizes are less than the size of the root node, processing returns to block 702 to look for additional child nodes. Otherwise, processing moves to block 712, where parsing of the tree structure is completed. Processing then proceeds to a calling process for further actions.

The blocks included in processes 600 and 700 are for illustration purposes. A system for preserving unrepresented data in a document exchanged between applications may be implemented by a similar process with fewer or additional steps including customization of forming the tree structure and merging changes to the edited document or in other order of the illustrated steps.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for preserving unrepresented data in a document exchanged between a first application and a second application for editing and displaying the document with distinct editing capabilities, comprising:

enabling the document to be edited by a user through the first application, wherein editing the document through the first application includes displaying the contents of the document;

parsing the document to generate a tree representation of the document, wherein a root of the tree corresponds to the document and nodes of the tree correspond to one of elements and properties of the document;

associating a size with each node of the tree, wherein a size of a leaf node corresponding to an element is determined by a number of document units associated with the element, and a size of a branch node is determined by an aggregate of leaf node sizes underneath the branch node;

flagging a node when the node corresponds to unrepresented data, wherein the unrepresented data is a portion of contents in the document editable by the first application but not editable by the second application;

enabling the document to be edited by a user through the second application, wherein editing the document through the second application includes displaying the contents of the document but not allowing editing of the unrepresented data;

receiving edits on the document from the second application; and maintaining unrepresented data for subsequent editing through the first application by observing the flagged node when exchanging the edited document between the second application and the first application.

2. The computer-implemented method of claim 1, wherein flagging the node corresponding to unrepresented data comprises assigning a size value of zero to the node.

3. The computer-implemented method of claim 1, wherein flagging the node corresponding to unrepresented data comprises associating a predetermined character with the node.

4. The computer-implemented method of claim 1, wherein the document unit includes at least one of a letter, a character, a word, a sentence, a paragraph, a table, and a cell.

5. The computer-implemented method of claim 1, further comprising editing the nodes of the tree in response to an edit to the document.

6. The computer-implemented method of claim 5, wherein editing includes at least one of inserting new document units, deleting existing document units, and modifying existing document units.

7. The computer-implemented method of claim 5, wherein the edits to the document and unrepresented data are merged by arranging the edited nodes and nodes corresponding to unrepresented data within the tree structure such that nodes corresponding to unrepresented data are preserved.

8. The computer-implemented method of claim 1, wherein exchanging the document between the first application and the second application includes at least one of modifying the document and saving the document.

9. The computer-implemented method of claim 1, wherein the unrepresented data includes at least one of formatting information, a footnote, a comment, and a non-text symbol within a substantially text document.

10. A computer-readable medium having computer instructions encoded thereon for preserving unrepresented data in a document exchanged between a first application and a second application for editing and displaying the document with distinct editing capabilities, the instructions comprising:

enabling the document to be edited by a user through the first application, wherein editing the document through the first application includes displaying the contents of the document;

generating a tree representation of the document, wherein a root node corresponds to the document and each node of the tree corresponds to one of elements and properties of the document;

associating a size with each node of the tree, wherein a size of a node corresponding to an element is determined by a number of document units associated with the element, and a size of a branch node is determined by an aggregate of node sizes underneath the branch node;

assigning a predetermined size to a node when the node corresponds to unrepresented data, wherein the unrepresented data is a portion of contents in the document editable by the first application but not editable by the second application;

enabling the document to be edited by a user through the second application, wherein editing the document through the second application includes displaying the contents of the document but not allowing editing of the unrepresented data;

receiving edits on the document from the second application; and maintaining the unrepresented data for subsequent editing by the first application by observing the nodes with the predetermined size when exchanging the edited document between the second application and the first application.

11. The computer-readable medium of claim 10, wherein the predetermined size is zero.

12. The computer-readable medium of claim 10, wherein handling the document by the second application with limited capability includes ignoring the nodes with the predetermined size during at least one of inserting new document units, deleting existing document units, and modifying existing document units in the document.

13. The computer-readable medium of claim 10, wherein the unrepresented data includes at least one of formatting information, a footnote, a comment, and a non-text symbol within a substantially text document.

14. The computer-readable medium of claim 10, wherein the first application and the second application are executed in computing devices that have distinct capabilities of displaying information associated with the nodes with the predetermined size.

15. A computer-implemented method for handling a document with unrepresented data, exchanged between a first application capable of editing all data within the document and a second application incapable of editing the unrepresented data within the document, the method comprising:

parsing a tree representation of the document beginning with a root node, wherein the root node includes accumulated size information corresponding to a sum of sizes of all child nodes within the tree and wherein the child nodes of the tree correspond to one of elements and properties of the document a portion of which are not editable by the second application;

ignoring each node with a size value of zero, wherein a size value of a leaf node corresponding to an element is determined by a number of document units associated with the element, and a size value of a branch node is determined by an aggregate of leaf node size values underneath the branch node;

accumulating the size values as the tree is parsed;

completing the parsing when the accumulated size values are substantially equal to the root node size value;

enabling editing of the document through the second application, wherein editing the document through the second application includes displaying the contents of the document but not allowing editing of the unrepresented data; and receiving edits on the document from the second application; and exchanging the edited document between the second application and the first application.

16. The computer-implemented method of claim 15, wherein the nodes with the size value of zero include at least one of unrepresented data and property information.

17. The computer-implemented method of claim 15, wherein editing the document through the second application includes performing at least one of inserting new document units, deleting existing document units, and modifying existing document units in the document.

18. The computer-implemented method of claim 15, wherein exchanging the edited document between the second application and the first application includes saving and transmitting the document by the second application to the first application, and wherein each node with the size value of zero is observed such that unrepresented data associated with each node with the size value of zero is substantially maintained.

* * * * *